March 2, 1926. Re. 16,280

C. A. PALMER

DENTAL MOLD CUP

Original Filed Nov. 26, 1919

INVENTOR
Charles A Palmer
BY
Fred C Matheny
ATTORNEY

Reissued Mar. 2, 1926.

Re. 16,280

UNITED STATES PATENT OFFICE.

CHARLES A. PALMER, OF SEATTLE, WASHINGTON, ASSIGNOR, BY MESNE ASSIGNMENTS, TO VINCENT B. VAUGHAN.

DENTAL MOLD CUP.

Original No. 1,351,584, dated August 31, 1920, Serial No. 340,893, filed November 26, 1919. Application for reissue filed August 30, 1922. Serial No. 585,320.

*To all whom it may concern:*

Be it known that I, CHARLES A. PALMER, a citizen of the United States, residing at Seattle, in the county of King and State of Washington, have invented certain new and useful Improvements in Dental Mold Cups, of which the following is a specification.

This invention relates to dental mold cups, and its object is the improvement of mold cups whereby the manufacture of tooth inlays is facilitated.

The invention consists in a substantially cylindrical cup having cavities in its opposite ends which are connected by an axially disposed opening. The invention further consists in producing a cup of this character from a moisture absorbent material, as from finely divided carborundum mixed with a suitable binder.

In the art of casting in which a pattern is embedded in a plastic investment and the investment is allowed to harden around the pattern to form a mold in which the casting may be done it is new so far as I am aware to provide an investment receptacle of highly absorbent material that will absorb the water rapidly from the investment thereby causing the investment to harden and become ready for use in a relatively short period of time. The use of the absorbent cup makes it practical to employ an investment material that may be hardened by the application of heat within a very short time after it is poured into the investment receptacle whereas it has heretofore been common practice to use investment materials that crystallize in setting and consequently require considerable time to set properly and which I have found do not produce as accurate and exact an impression of the pattern as the non-crystallizing investments which I prefer to use.

Figure 1:
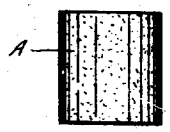
Figure 2:
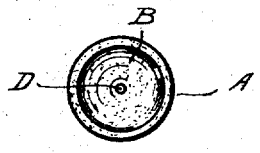
Figure 3:
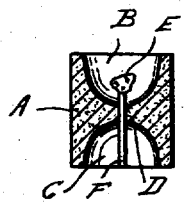
Figure 4:
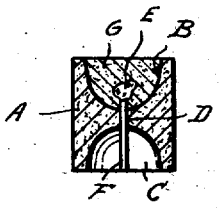
Figure 5:
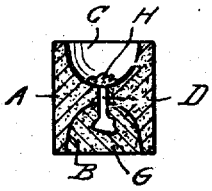

In the accompanying drawings, Figure 1 is a side elevational view and Fig. 2 is an end view of a mold cup embodying the present invention. Figs. 3, 4 and 5 are longitudinal sectional views of the same to illustrate the application of the invention.

In carrying out my invention I provide a cup A of a cylindrical form, preferably made of a porous material having water absorbing characteristics.

In its opposite ends the cup is provided with conoidal cavities B and C which are communicatively connected by a relatively small hole D disposed axially of the cup.

In using the cup, a pattern E of wax or the like taken of a tooth cavity is first given a thin coating of clayey substance conventionally known as investment, and is impaled upon a wire sprue F of a diameter to fit within the hole D in which the sprue is inserted and thereby held in upright position to retain the pattern in proximity of the center of the cavity B, as shown in Fig. 3.

The pattern is next embedded in a plastic investment G, Fig. 4, which is quickly dried by having the water extracted therefrom by being absorbed by the material of the containing cup.

The cup is then exposed to the action of a blowpipe flame, or an equivalent, to cause the moisture to be evaporated from the cup, complete the hardening of the investment and raise the temperature of the latter sufficiently to effect the destruction of the wax pattern.

The cup is then inverted into its Fig. 5 position, the sprue F removed from the cup and a piece of metal H, such, for example as a gold nugget, is placed in the cavity C. The flame is again applied to render the cup hot and effect the melting of the metal which is caused to flow or be forced through the hole D to fill the mold formed by the pattern E in the investment G.

The forcing of the molten metal through the cup hole may be accomplished by any well known suitable means.

The cup and investment are then broken away to release the casting or inlay from the mold.

In the practice of my invention, best results are obtained with what may be termed absorbent investments, from which the moisture may be readily withdrawn by being absorbed by the cup and hardens when heat is applied to the latter rather than that type of investments which crystallizes in setting.

The invention is of inexpensive construction, convenient to use, and efficient in producing a high quality of work.

What I claim, is—

1. A dental mold cup consisting of a cylindrical body made of porous material, having water absorbent characteristics, said cup being provided in each end with a conoidal cavity which cavities are communicatively connected by a small hole wherein a sprue wire can be supported by the cup structure.

2. In a combination, a dental mold cup consisting of a body having cavities at its opposite ends connected by axially disposed hole, a sprue wire adapted to fit within said hole, and thereby be retained in position to extend into both of the cavities, and an investment for producing a mold about a pattern impaled upon said wire in one of said cavities.

3. A receptacle for a plastic investment embodying a body portion of water absorbent material having cavities each adapted for the reception of material used in casting, said cavities being connected with each other by a small hole.

Signed at Seattle, Washington, this 24th day of August, 1922.

CHARLES A. PALMER.